United States Patent [19]
Van Den Heuvel et al.

[11] Patent Number: 5,278,990
[45] Date of Patent: Jan. 11, 1994

[54] TWO WAY RADIO COMMUNICATION SYSTEM

[75] Inventors: Anthony P. Van Den Heuvel, Parkland, Fla.; Michael D. Kotzin, Buffalo Grove, Ill.

[73] Assignee: Motorola, Inc., Schaumburg, Ill.

[21] Appl. No.: 41,139

[22] Filed: Mar. 30, 1993

Related U.S. Application Data

[63] Continuation of Ser. No. 680,604, Apr. 1, 1991, abandoned, which is a continuation of Ser. No. 419,231, Oct. 10, 1989, abandoned.

[51] Int. Cl.$^5$ .............................................. H04B 7/14
[52] U.S. Cl. ........................................ 455/15; 455/17; 455/23; 455/54.1; 455/72; 381/30
[58] Field of Search .................... 455/15, 17, 23, 54.1, 455/56.1, 69-70, 72, 33.1, 53.1, 89, 127, 142, 143, 343; 375/5, 47, 122; 381/30, 31; 370/109, 118

[56] References Cited

U.S. PATENT DOCUMENTS

| | | | |
|---|---|---|---|
| 3,667,047 | 5/1972 | Iwasaki et al. | 455/72 |
| 4,123,711 | 10/1978 | Chow | 455/72 |
| 4,253,072 | 2/1981 | Fischer et al. | 455/72 |
| 4,551,853 | 11/1985 | Denman et al. | 455/72 |
| 4,622,680 | 11/1986 | Zinser | 370/118 |
| 4,656,645 | 4/1987 | Kaneko | 375/122 |
| 4,741,018 | 4/1988 | Potratz et al. | 455/72 |
| 4,802,222 | 1/1989 | Weaver | 375/122 |
| 4,835,792 | 5/1989 | Davarian | 455/142 |
| 4,852,129 | 7/1989 | Schwartz | 381/31 |
| 4,876,740 | 10/1989 | Levine et al. | 455/33 |
| 4,930,126 | 5/1990 | Kazecki et al. | 370/109 |

FOREIGN PATENT DOCUMENTS

| | | | |
|---|---|---|---|
| 3414632 | 10/1985 | Fed. Rep. of Germany | 455/72 |
| 0117825 | 6/1985 | Japan | 455/72 |

*Primary Examiner*—Jin F. Ng
*Assistant Examiner*—Andrew Faile
*Attorney, Agent, or Firm*—Pedro P. Hernandez

[57] ABSTRACT

A radio communication system includes a central station such as a repeater for transmitting FM signals to a plurality of radios. The repeater 11 is capable of receiving both analog speech FM signals and compressed voice signals. This permits the use of energy efficient transmission schemes by some of the radios operating in the system while permitting use of both types of transmission by the various remote radios.

5 Claims, 2 Drawing Sheets

TWO WAY RADIO COMMUNICATION SYSTEM

This is a continuation of application Ser. No. 07/680,604, filed Apr. 1, 1991 abandoned, which is a continuation of application Ser. No. 07/419,231, filed Oct. 10, 1980 abandoned.

BACKGROUND OF THE INVENTION

This invention relates to two-way radio communication systems in general and particularly to a system wherein the power efficiency of portable radio transceivers utilized in this system can be enhanced. In conventional two-way radio communication systems, such as an FM system utilized at VHF/UHF frequencies, a central system, which can be a trunked radio communication system, a repeater, or a base station which could serve as a telephone interconnect, uses a single modulation format for transmissions both to and from the portable or remote radios and the central system. In such systems, reasonable power efficiencies of the receivers of the portable transceivers can be achieved. Where a wide area of coverage is required, high transmit power levels are required in the portable radios. Such power levels can require a substantial percentage of the battery energy of the portable radios. It is to be desirable to provide a system in which the energy consumed in transmitting signals from the portable radios to the central system can be reduced. It is also desirable that the system be operable to the greatest extent with existing equipment.

SUMMARY OF THE INVENTION

This two-way radio communication system permits increased transmitter efficiency of portable transceivers while allowing the use of conventional transceivers in the system. The system includes a plurality of portable radio transceivers and a central system. The central system includes a transmitter for transmitting signals to the portable radios in a first communication mode and a receiver including means for receiving signals from the portable radio transceivers in said first communication mode and further includes means for receiving signals transmitted from portable radios in a compressed signal mode.

In one aspect of the invention, the transmitted and received signals are voice signals. In another aspect of the invention, the first communication mode is analog frequency modulated RF signals. In still another aspect of the invention, the second communication mode is bursts of information. Said bursts comprise compressed speech. The encoded speech is encoded as multi-level subband coding. In still another aspect of the invention the encoded speech is compressed by at least approximately a 2-to-1 ratio. The portable radio transceiver includes a receiver for receiving FM signals and a transmitter for transmitting compressed bursts of voice information. In another aspect of the invention, the receiver includes means for decoding information transmitted on said FM signal between transmission of said bursts of voice information. In still another aspect of the invention, the transceiver transmitter means includes a power level control means for adjusting the power level of transmitted bursts of voice information based upon the decoded information.

DESCRIPTION OF THE PREFERRED EMBODIMENT

Figure 1:
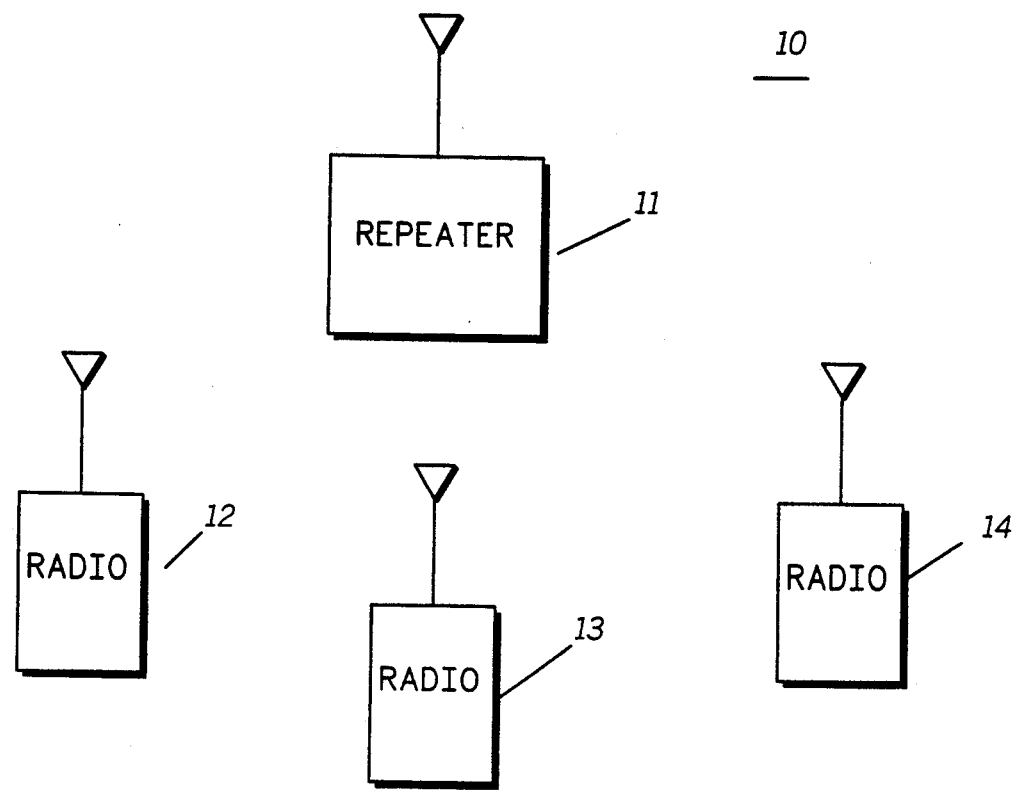
FIG. 1 is a block diagram of a radio communication system in accordance with the present invention.

Referring now by characters of reference to the drawings and first to FIG. 1, it will be understood at a radio communication system, generally indicated by 10, includes a central system such as repeater 11 and a plurality of remote radio transceivers 12, 13, and 14.

One or more of the radios 12–14 can be conventional radios. For example, radios 13 and 14 could be conventional two-way portable FM transceivers, while radio 12 can utilize a different transmission approach in order to reduce its power consumption.

Repeater 11, which could be a trunked radio system or other central system, transmits frequency modulated signals but is capable of receiving signals from any of the radios 12–14. This is important, since it is desirable that the system 10 permit the use of conventional radios while allowing the use of the transmit power efficient radio 12. Preferably, the radio 12 operates by transmitting bursts of speech encoded information. It is possible to compress the speech by at least a 2-to-1 ratio thereby requiring only half the transmission time by radio 12, for a given amount of speech information. The bursts of information can be transmitted at the same power level as the continuous or FM modulated signal by radio 13 and 14 without degrading the coverage of the system 10. Consequently, during transmit, approximately a 50% power saving can be accomplished by radio 12.

Figure 2:
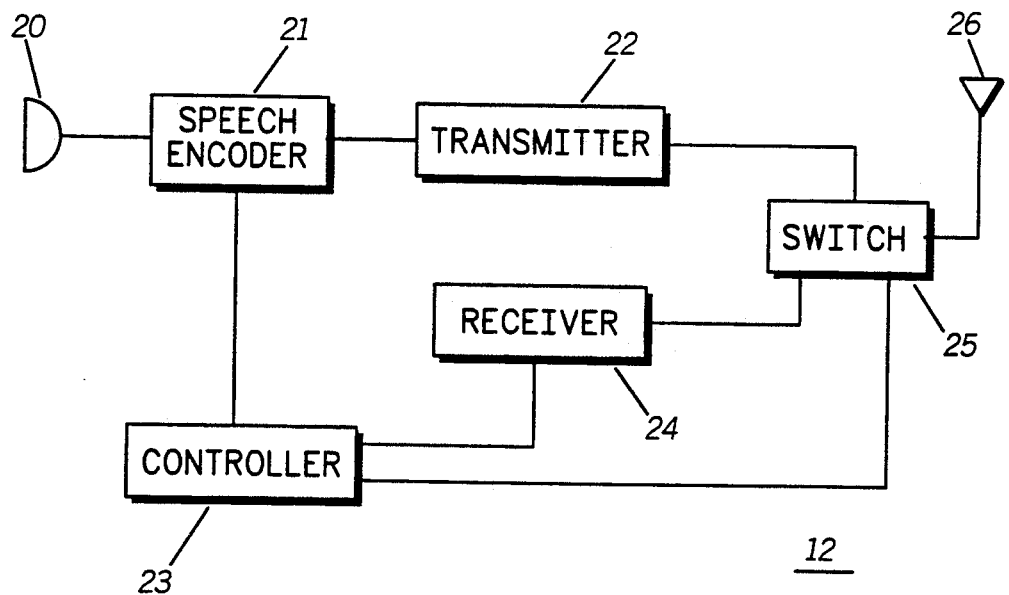
FIG. 2 is a block diagram of a portable radio for use in the system of FIG. 1.

Referring now to FIG. 2, a block diagram of the radio 12 is illustrated. Voice signals from microphone 20 are applied to speech encoder 21 prior to application to the transmitter portion 22 to the radio. A controller 23, such as a microprocessor or the like, is used to control the transmitter portion 22 as well as the receiver portion 24 and antenna switch 25, so that transmitted signals can be routed to an antenna 26 for transmission.

In the preferred embodiment, the speech encoder 21 can provide four filter multi-level subband coding (MSBC). As an example, the radio can transmit a burst of coded information representing 240 milliseconds of actual speech in 120 milliseconds time using 6000 symbols per second channel signalling. For voice transmission purposes it is not necessary for the receiver 24 to be turned on between transmission of bursts of speech information. If the system 10 is configured to transmit commands to the radio 12 during the interburst time periods, the radio 12 can go in the receive mode to detect and decode information during that time. Various types of commands can be included on the modulated FM signal from repeater 11, such as priority interrupts to allow another radio to use the channel. In order to even further increase transmitter efficiency, the repeater 11 can measure the strength of the received signal bursts from the radio 12 and transmit power adjustment information to the portable radio. Based upon this information, received between the transmitted bursts, the controller 23 can actuate the transmitter 22 to adjust the power level thereby further improving the energy efficiency of the radio.

Figure 3:
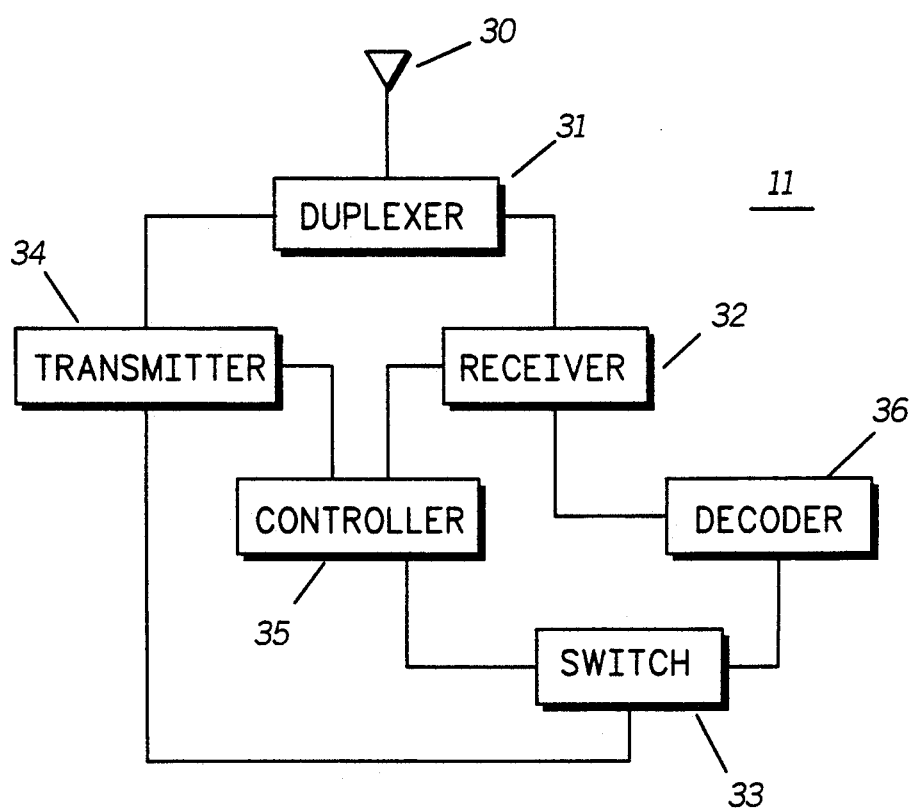
FIG. 3 is a block diagram of a repeater for use in the system of FIG. 1.

The repeater 11 is illustrated in further detail in FIG. 3. The signals received at antenna 30 are provided by a duplexer 31 to a receiver 32. If the received signals are conventional audio signals, they can be routed via a switch 33 to transmitter 34 for transmission. However, if the received signals are detected to be a burst communications from radio 12, a controller 35 can actuate a decoder 36 for decoding the bursts of voice information to reconstruct the voice information. In that case, the controller 35 actuates switch 33 to apply the reconstructed voice signals to the transmitter section 34.

Control signals such as subaudible tones or binary information can be encoded with the voice signals for transmission. For controlling power level of a radio 12, the receive signal strength from receiver 32 is passed to controller 35 which encodes an appropriate subaudible command for transmission. Where a sufficiently strong received signal is present the radio 12 can be commanded to transmit at lower power level.

The communication system 10 permits use of conventional two-way FM radio equipment, such as radios 13 and 14, while also allowing for the use of improved efficiency burst transmission or other efficient transmission scheme by radio 12. The repeater 11 does the conversion of the energy efficient signals into the standard format prior to transmission via repeater transmitter 34.

We claim as our invention:

1. A radio communication system including a plurality of radio transceivers and a central system, the central system including:

a receiver including means for receiving analog frequency modulated voice signals transmitted by at least one of said radio transceivers and further including means for receiving voice signals transmitted by at least another one of said radios in a compressed mode;

a decoder means coupled to the receiver for decoding the received compressed mode voice signals and converting them into decompressed analog voice signals; and a transmitter responsive to the receiver for transmitting either the analog frequency modulated voice signals or the voice signals received in a compressed mode by the receiver as analog frequency modulated voice signals to at least one of said plurality of radio transceivers.

2. A radio communication system as defined in claim 1, in which said compressed mode is bursts of encoded speech.

3. A radio communication system as defined in claim 2, in which said encoded speech is encoded utilizing multi-level subband coding.

4. A radio communication system as defined in claim 3, in which said encoded speech is compressed by least approximately a 2 to 1 ratio.

5. A radio communication system as defined in claim 1, wherein the central system is a repeater and the transmitter automatically retransmits, as analog frequency modulated voice signals, either the analog frequency modulated voice signals or the voice signals received in a compressed mode by the receiver.

* * * * *